C. H. HEMMING.
KNIFE HANDLE POLISHING MACHINE.
APPLICATION FILED DEC. 13, 1916.

1,255,879.

Patented Feb. 12, 1918.
7 SHEETS—SHEET 1.

Fig.1

WITNESSES:
Albert Bedwin
F. D. Riordan

INVENTOR
Carl H. Hemming
BY Geo. D. Phillips
his ATTORNEY

C. H. HEMMING.
KNIFE HANDLE POLISHING MACHINE.
APPLICATION FILED DEC. 13, 1916.

1,255,879.

Patented Feb. 12, 1918.
7 SHEETS—SHEET 2.

Fig. 2

WITNESSES:

INVENTOR
Carl H. Hemming
BY Geo. D. Phillips
his ATTORNEY

UNITED STATES PATENT OFFICE.

CARL H. HEMMING, OF NEW HAVEN, CONNECTICUT.

KNIFE-HANDLE-POLISHING MACHINE.

1,255,879.  Specification of Letters Patent.  Patented Feb. 12, 1918.

Application filed December 13, 1916. Serial No. 136,638.

*To all whom it may concern:*

Be it known that I, CARL H. HEMMING, a citizen of the United States, residing at New Haven, in the county of New Haven and State of Connecticut, have invented certain new and useful Improvements in Knife-Handle-Polishing Machines; and I do hereby declare the following to be a full, clear, and exact description of the invention, such as will enable others skilled in the art to which it appertains to make and use the same.

My invention relates to automatic machines adapted especially for grinding or polishing cutlery handles.

In the accompanying drawings:—

The mechanism, the arrangement and combination of the various elements to produce the desired effect comprises the base 1 on which is adjustably mounted the standard 2 supporting the polishing wheel shaft 3 on which is mounted the polishing wheel 4. The shaft is rotated through the medium of the pulley 5 and from a source of power—not shown. The adjustment of standard 2 is effected through the medium of the hand wheel 6, shaft 7, bevel gears 8 and threaded shaft 9, Figs. 1, 2 and 3.

10 is an overlying bed supported on the standards 11 and which carries the main elements of the operative mechanism. It will be noted that the principal mechanism is located at one side and away from the polishing wheel and will be inclosed and is thus isolated and fully protected against the flying emery dust which would otherwise soon destroy the various working surfaces of the mechanism.

Figure 1:
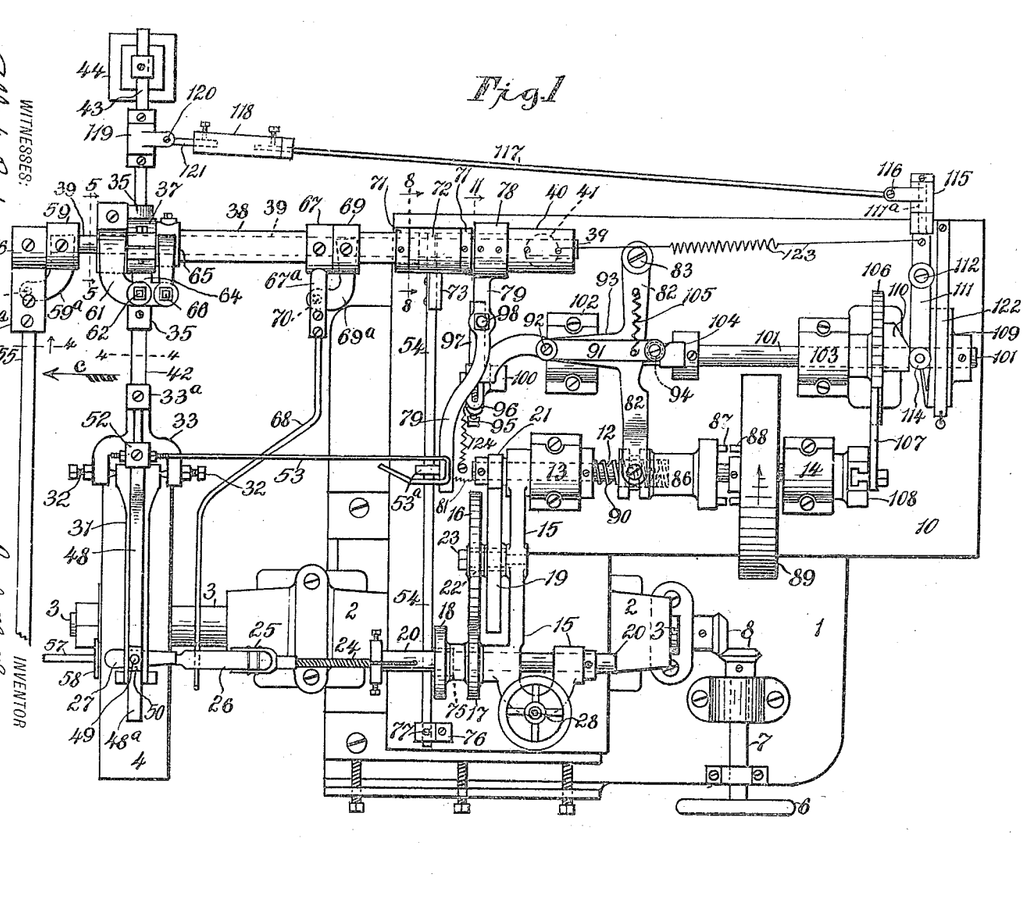
Figure 1 represents an upper plan view of the machine and broken view of the stop mechanism for the knife handle.
Figure 18:
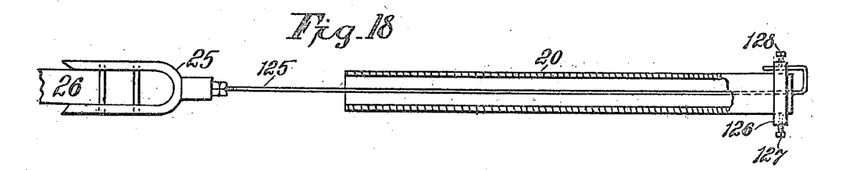
Fig. 18 is an enlarged broken view partly in section of the knife rotating shaft and the preferable means for connecting it with the knife holder and rotating the same.

12 is the main driving shaft journaled in the standards 13, 14; and 15, Fig. 1, is a frame journaled on the shaft 12 and it carries the elliptical gears 16—17, cam 18, spur gear 19 and knife rotating shaft 20. The latter is journaled in the free end of the swinging frame 15 and is rotated through the medium of the pinion 21, gear 19 and elliptical gears 16 and 17. The elliptical gear 16 and spur gear 19 are keyed to the bushing 22, Figs. 1 and 8, and the bushing is journaled on the stud 23. The elliptical gear 17 and cam 18 are secured to the shaft 20. The flexible shaft 24, is secured to said shaft and carries at its free end the knife holder 25 to which the end of the blade 26 is temporarily secured while the knife handle 27 rests on the wheel 4 during the operation of grinding or polishing. In place of the flexible shaft I propose to use the arrangement shown in Fig. 18, presently to be more fully described. The swinging frame 15 is adapted to have a vertical adjustment to accommodate different sizes of polishing wheels without disturbing the relative working position of the operative elements mounted thereon. This vertical adjustment is effected by means of the screw 28—see particularly Fig. 3. This screw passes through a threaded hole in the frame 15 and is firmly secured to the frame in any of its adjusted positions by the check nut 29, the lower and reduced end of this screw passes freely through the elongated hole 30 of the raised portion 10$^a$ of the bed so that the lower end of said screw may have a free lateral movement to compensate for the radial movement of the frame 15. 28$^a$ is a spring on the lower end of the screw 28 to prevent the frame 15 lifting when the cam 18 is in active operation.

Figure 2:
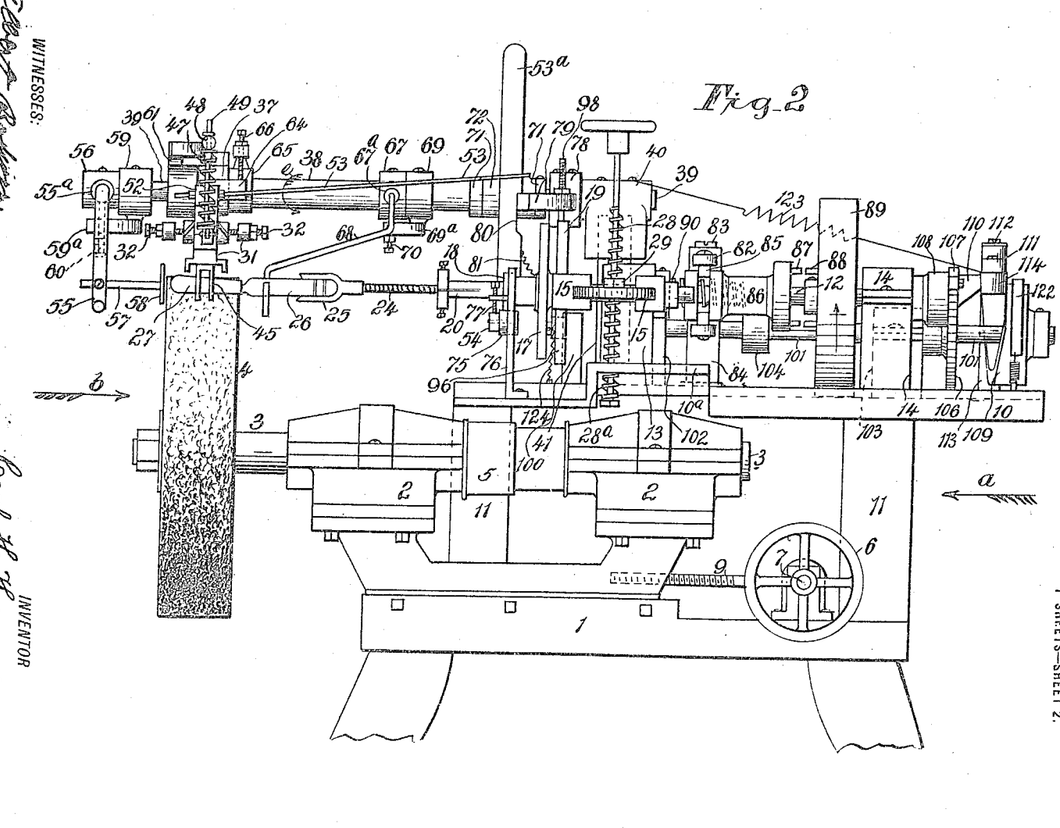
Fig. 2 is a front elevation of the machine.
Figure 3:
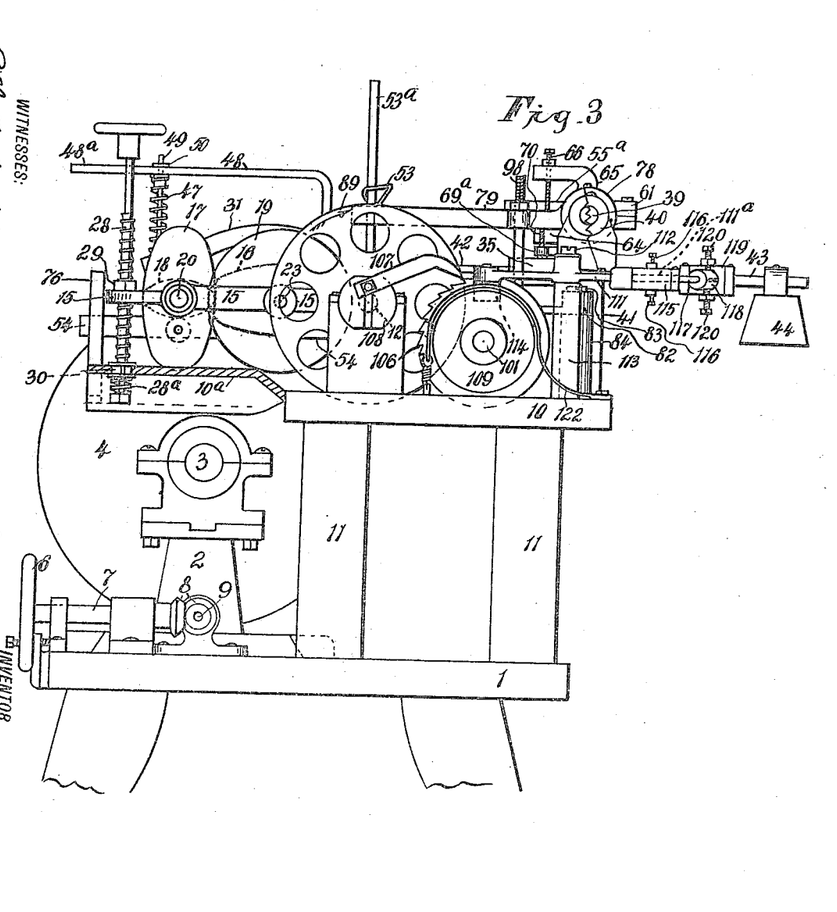
Fig. 3 is an end view of the machine looking in the direction of arrow *a*, Fig. 2, and sectional view of a part of the bed.
Figure 4:
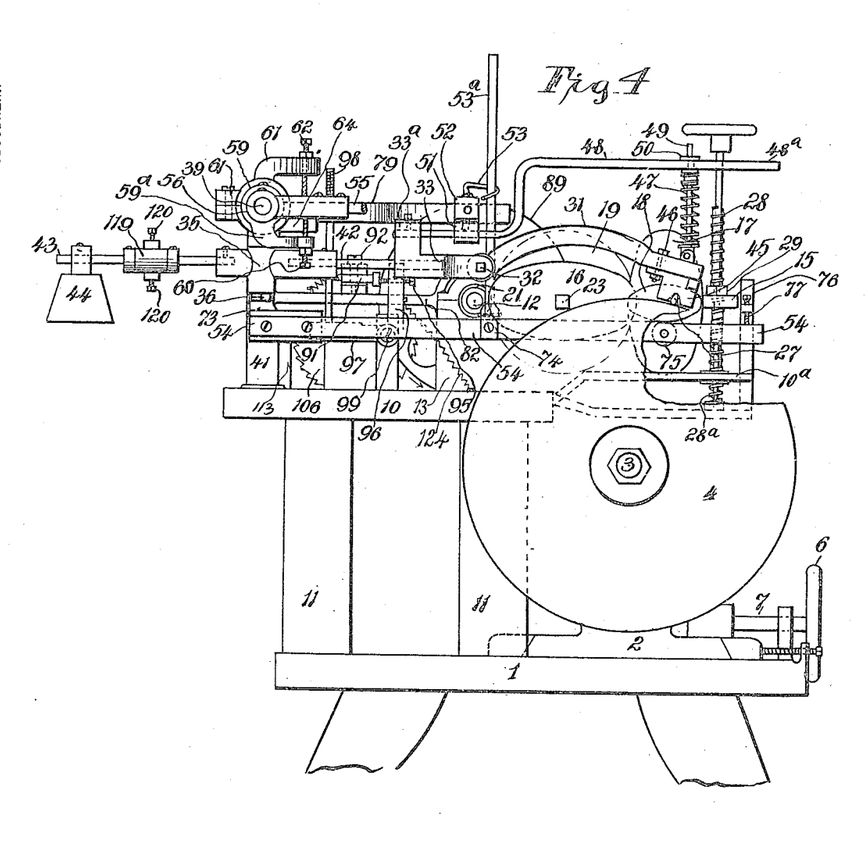
Fig. 4 is an end view of the machine looking in the direction of arrow *b*, Fig. 2, and broken view of the handle stop mechanism on line 4—4 of Fig. 1 and broken view of the polishing wheel.
Figure 12:
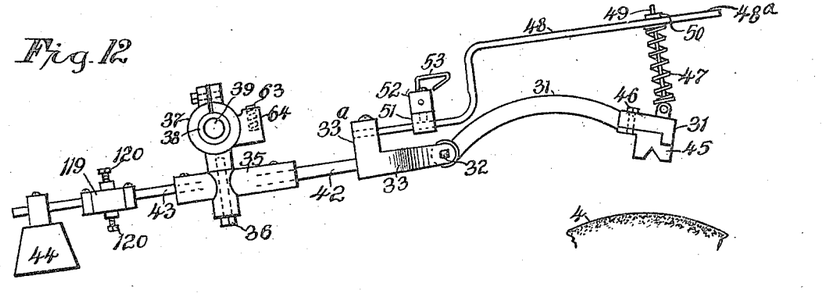
Fig. 12 is an assembled view of the presser arm mechanism and broken view of the polishing wheel showing the said mechanism in its elevated position above the wheel.

The operative mechanism in close relation to the knife handle comprises the presser arm 31, Figs. 1, 4 and 12, pivotally supported on the screws 32 in the forked head 33 of the presser arm supporting mechanism and is adapted to have a vertical movement on said screws. 35, Figs. 2, 4, 5, and 12, is a head laterally swiveled on the bolt 36 anchored to the underside of the clamp collar 37 clamped to the sleeve 38, which sleeve is adapted to oscillate on the rod 39 anchored in the head 40, Figs. 1, 2 and 3, mounted on the column 41. 42 is a rod connecting the head 35 with the forked head 33, and 43 is an arm connecting the weight 44 with said head 35. The free end of the presser arm 31 carries the presser foot 45, Figs. 2, 4, 12 and 13, adapted to maintain contact of the knife handle with the polishing wheel. This foot is pivoted at its rear end to the bolt 46, Figs. 4 and 12, so that it will always aline with the polishing wheel while engaged with the knife handle, regardless of the angular position of the laterally oscillating head 35.

The presser arm supporting mechanism has a horizontal oscillating movement by reason of the head 35, and a vertical oscillating movement by reason of its connection with the sleeve 38 on rod 39, and the presser arm 31 has an independent vertical movement by reason of its pivotal connection with the before mentioned forked head 33. The purpose of this independent movement of this arm 31 is to admit of an extra pressure being applied to the flat sides of the knife handle when the same are presented to the surface of the polishing wheel and under the extra tension applied to the spring 47 interposed between the arm 31 and the handle lever 48. The lower end of rod 49 is pivoted to the arm 31 and its upper end passes freely through the handle lever. The washer 50 is secured to the rod to maintain the connection between said rod and arm. This handle lever is anchored in the projection 33$^a$ of the forked head 33. 51 is a block secured to the handle lever 48, Figs. 4 and 12, and 52 is an overlying block swiveled thereto carrying the trip rod 53 adapted to engage with the trip or locking lever 53$^a$ pivotally supported on the bar 54 presently to be more fully described.

55, Figs. 1 and 2, is a rod secured to the projection 55$^a$ of the collar 56 adjustably secured on the end of the rod 39. The lower end of this rod is adjustably connected with the rod 57 carrying the pad 58 adapted to act as a stop for the end of the knife handle. 59 is a collar also secured to the rod 39 having the tail piece 59$^a$ extending under the projection 55$^a$ and carrying the adjusting screw 60 to engage said projection, Fig. 4, so that the position of the pad 58 may be vertically adjusted in conjunction with the before mentioned oscillating frame 15 for different sizes of polishing wheels.

Figures 5, 6, 7, 8:
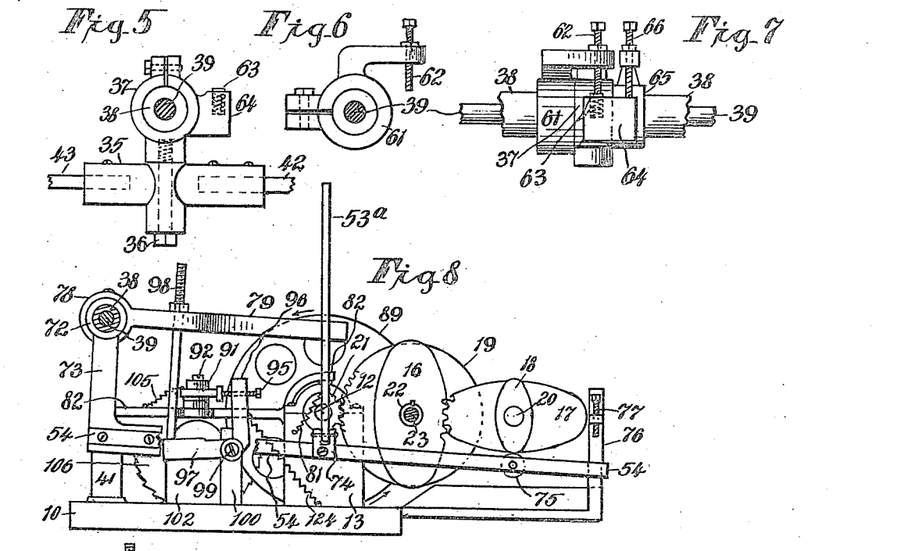
Fig. 5 is an enlarged detail side elevation of one of the elements secured to the oscillating sleeve and sectional view of the sleeve supporting rod on line 5—5 of Fig. 1, also a view of the head of the presser arm mechanism swiveled to said element, and broken view of the weight supporting rod and the rod connected with the presser arm mechanism.
Fig. 6 is an enlarged detail view of one of the elements secured to the oscillating sleeve, and sectional view of the sleeve supporting rod.
Fig. 7 is an enlarged detail front elevation of three of the sleeve carrying elements in working relation with each other and broken view of the oscillating sleeve and its supporting rod.
Fig. 8 is a sectional view of the oscillating sleeve and its supporting rod on line 8—8 of Fig. 1, showing the position of certain operative parts of the machine when an extra pressure is applied to the knife handle when one of its flat sides engage the grinding wheel, also broken view of one of the actuating levers adapted to assist in effecting such extra pressure.

61—see also Figs. 6 and 7—is a clamp collar secured to the sleeve 38 and it carries the adjusting screw 62 adapted to contact with the bumper spring 63 carried by the clamp collar 37 and located in the projection 64 of said collar to act as a shock-absorber when the presser bar mechanism is suddenly disengaged and thrown upward by the weight 44. Adjacent to collar 37 is the collar 65 carrying the adjusting screw 66 adapted to contact with said projection 64 to adjust the position of the bumper spring for different sizes of polishing wheels.

67, Fig. 1, is a collar secured to the sleeve 38 having the projection 67a in which is located the rod 68—see also Fig. 2—whose free end lies under the knife blade to lift the knife handle from the polishing wheel when the sleeve 38 is rotated at the completion of the polishing operation. Adjacent to collar 67 is the coller 69 having the tail piece 69a carrying the adjusting screw 70 adapted to contact with the projection 67a to adjust the position of the lift rod 68 with respect to the before mentioned position of the adjustable frame 15 when said frame is adjusted for different sizes of polishing wheels.

Located between the two fixed collars, 71 Fig. 1, is the collar 72 journaled on the sleeve 38 and having—see also Figs. 4 and 8—the tail piece 73 to which is secured the spring compression bar 54 carrying the block 74 to which—as before mentioned—the trip lever 53a is pivoted. This bar also carries the roll 75 adapted to be engaged by the cam 18 to depress said bar. The upright 76 carries the adjusting screw 77 to regulate and determine the amount of contact of the cam with the roll and, consequently, the amount of depression of the bar.

The collar 78, Figs. 1 and 8, is secured to the sleeve 38 and has the arm 79 adapted to form a locking engagement with the trip lever 53a for which the notch 80, Fig. 2, is provided in said lever. 81 is a spring adapted to normally hold the lever against said arm.

Figure 9:
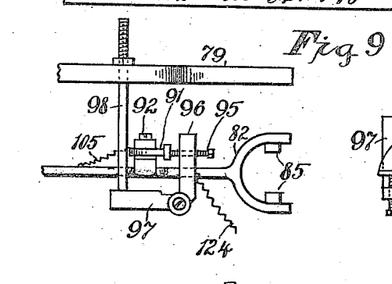
Fig. 9 is a detail view, partly broken, of mechanism connected with the clutch mechanism.

82—see particularly Figs. 1, 10, 16 and 17— is a clutch lever journaled on the screw 83 secured to the top of the post 84, Fig. 3. The forked end of this lever is equipped with the usual rolls 85, Figs. 9 and 11, to operate between the grooved collar 86 slidable on shaft 12 and rotatable therewith. The driving pins 87 of this collar are adapted to engage with the driving pins of the continuously running pulley 89 to impart a rotary movement of said shaft, and the spring 90 is adapted to effect such engagement.

91 is a lever pivoted on the screw 92 secured to the end of the arm 93 of lever 82. One end of this lever carries the roll 94, and the opposite end is adapted to be engaged by the adjusting screw 95, Figs. 8 and 9, carried by the bell crank lever arm 96. The other crank lever arm 97 is adapted to be engaged by the adjustable rod 98 carried by the arm 79 by which said lever 91 is actuated. This bell crank lever is pivoted on the screw 99 secured to the post 100, Fig. 8.

101, Fig. 1, is a cam shaft journaled in the standards 102—103, Fig. 1, and 104 is a cam mounted on said shaft adapted to engage the roll 94 of lever 91 to disengage the clutch collar 86 from the driving pulley 89. 105 is a spring adapted to normally hold the lever 91 and its roll 94 in the position shown in Fig. 1.

106 is a ratchet wheel mounted on shaft 101 actuated by the pawl 107, Figs. 1 and 3, to give a step by step rotation to the shaft 101 from the driving shaft 12. The pawl 107 is adjustably connected to the slotted collar 108 mounted on the end of said driving shaft.

109, Fig. 1, is a cam mounted on the shaft 101 operating in conjunction with the cam projection 110 integral with the face of the ratchet wheel 106. 111 is a lever pivoted to the screw 112 mounted in the upper end of the post 113, Fig. 3. One end of this lever carries the cam roll 114, and the opposite reduced end 111a provides a journal for the collar 115. This collar carries the screws 116 to which one end of the rod 117 is pivoted while the opposite end of this rod is secured to the collar 118. On the weight rod 43 is journaled the collar 119 carrying the screws 120 to which the outer end of the short rod 121 secured to collar 118 is pivoted. The purpose of the cam 109 and its connection with the weight rod is to effect a lateral movement of the presser arm supporting mechanism having a lateral movement on the bolt 36, Figs. 4 and 5, as before mentioned. The brake band 122 embraces a portion of the periphery of the cam 109 to steady the rotative action of the shaft 101 while under the forward propelling movement of the pawl 107. The spring 123 serves to keep roll 114 against the working face of said cam.

Figure 10:
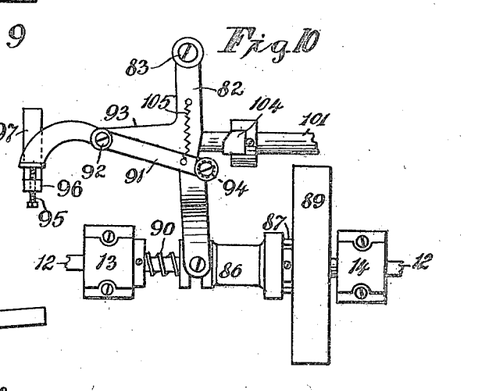
Fig. 10 is a detail plan view of parts of the clutch mechanism showing their position when the machine is in operation, also broken view of two shafts connected with the clutch operating mechanism.
Figure 11:
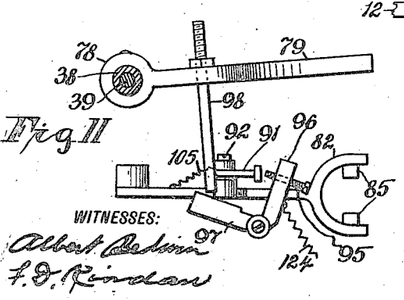
Fig. 11 is a detail view of parts of the clutch mechanism and their position when the machine is at rest, also sectional view of the oscillating sleeve and its supporting rod on line 11 of Fig. 1.
Figure 13:
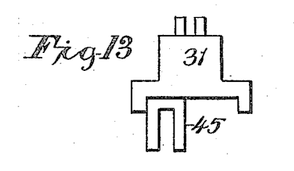
Fig. 13 is an enlarged detail end elevation of the presser foot and presser arm, broken view of the polishing wheel, broken view of a knife, showing the relative positions of the presser foot wheel and knife handle when about to begin the polishing operation.

The operation of the machine is as follows: The several parts of the machine are at a stand still as shown in Fig. 1 with the presser arm supporting mechanism carrying the presser foot, elevated above the polishing wheel 4, as shown in Fig. 12, and at the right hand of said wheel as shown in Fig. 13. Downward pressure applied to the end 48a of the handle lever 48 will turn the sleeve 38, on rod 39, and actuate the presser arm supporting mechanism to bring the presser foot 45 against the knife handle and force said handle against the polishing wheel as shown in Fig. 4. This partial rotation of sleeve 38 will also depress the forward end of arm 79 and cause the same to lock in the notch 80 of the trip lever 53ᵃ Fig. 2. Depressing lever 79 will also engage its rod 98 with the bell crank lever arm 97, Fig. 9, and, through the engagement of screw 95, of the vertical arm 96 of said crank lever turn lever 91 away from and out of contact with cam 104 as shown in Fig. 10. This will permit the spring 90 to force the engagement of the clutch pins of the sleeve 86 with the clutch pins of the continuously running pulley 89 and start the machine in operation. The step by step motion imparted to the cam shaft 101 will, by means of cam 109, lever 111 and rod 117, as before mentioned, slowly swing the presser arm mechanism forward of the sleeve 38 in the direction of arrow c, Fig. 1.

Figure 14:
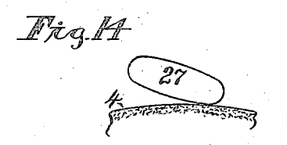
Fig. 14 is an enlarged detail end elevation of the knife handle, broken view of the polishing wheel, showing the handle as about to present its flat side to the wheel.
Figure 15:
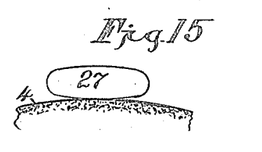
Fig. 15 is an enlarged detail end elevation of the knife handle, broken view of the polishing wheel showing the flat side of the handle against the wheel.
Figure 16:
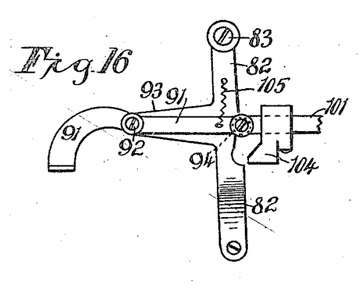
Fig. 16 is a detail view of the levers connected with the clutch mechanism showing their position when the presser arm mechanism is elevated at the completion of the polishing operation, also view of the cam shaft underlying the levers with the lever actuating cam mounted thereon.
Figure 17:
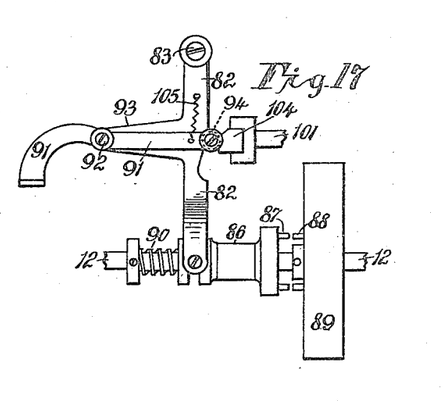
Fig. 17 is a view of the clutch mechanism and the position it assumes when the machine is in a state of rest, also broken view of the driving and cam shafts.

It is important that the flat surface of the knife handle receive more abrasion, travel slower and under greater pressure than the edges. As soon, therefore, as the edge of the knife handle has turned away from the wheel, Fig. 14, the cam 18 will begin to depress the bar 54 by the engagement of said cam with the roll 75, said cam being shown in its extreme bar depressing position in Fig. 8. As the bar 54 is depressed it will also, by reason of the locking engagement of the trip lever 53ᵃ with the arm 79, carry said arm down with the bar and cause the sleeve 38 to turn in the direction of arrow e, Fig. 2 and still further depress the forward end of the presser arm supporting mechanism and thus increase the tension of the spring 47 against the end of the arm 31 and thus cause an increased pressure against the knife handle. This extra pressure can only be attained and regulated only by reason of the pivoted connection of the bar 31 with the presser arm supporting mechanism and the spring 47. While the flat surface of the knife handle is thus in contact with the polishing or grinding wheel, Fig. 15, the position of the elliptical gears 16 and 17 is such that they will travel more slowly than at any other period of their rotation. In Fig. 8 they are shown, approximately, in the position of their slowest travel and the cam 18, as previously mentioned in its extreme bar depressing position. The amount of bar depression will depend on the position of the roll 75 with the cam and such position is regulated by the adjusting screw 77. The extreme depression is attained when the long diameter of the cam is in contact with the roll 75 at the start, as shown in Figs. 3 and 4. By means of screw 77, the bar 54 can be depressed until the roll is entirely out of contact with the cam when round surfaces can be polished instead of oval or other irregular surfaces. It should therefore, be understood that this cam is in no sense a former, as it could be of any shape that would depress the bar 54 to effect an increased pressure against the flat surfaces of the knife handle only. While the presser arm supporting mechanism is gradually swinging the forward portion of said mechanism in the direction of arrow c, Fig. 1, the sleeve 38 will oscillate under the influence of cam 18 to effect a medium pressure on the edges of the knife handle and a heavier pressure on its flat sides alternately until the presser foot is carried across the knife handle.

When the presser foot 45 has thus effected its work with respect to the handle, the cam 109 will continue to actuate the presser arm supporting mechanism far enough to force the pull rod 53 to break the contact between the trip lever 53ᵃ and the arm 79 which will then place the sleeve 38 under the control of the weight 44 which will turn said sleeve and elevate the presser arm supporting mechanism as shown in Fig. 12. When the sleeve is thus rotated by the weight, the arm 79, Fig. 11, will also be elevated and its rod 98 carried out of contact with the bell crank lever arm 97 which will place said bell crank lever under the influence of its retractile spring 124 and carry it out of contact with the lever 91 and the roll carrying end of said lever brought into the position shown in Fig. 16, by means of the spring 105. When the presser arm supporting mechanism is thus elevated, the finished knife is exchanged for an unfinished one, while the reverse actuating face of the cam 109 is carrying the presser foot 45 back to its starting point shown in Fig. 13. As soon as this point is reached, the cam 104 will be in position to engage the roll 94, Fig. 17, and force the clutch lever 82 back and the clutch sleeve 86 out of engagement with the driving pulley 89 and bring all of the operative elements of the machine to a state of rest and in readiness for repetition of the polishing operation just described.

In the preferred means, Fig. 18, for rotating the knife handle support, I make the shaft 20 hollow through which is extended the small driving wire 125 anchored to the collar 126 mounted on the rear end of the shaft. The set screw 127 secures the collar to the shaft and the set screw 128 secures the end of the wire to the collar. The other end of the wire is secured to the knife holder 25. The hollow shaft gives free play to the wire to permit the elevation of the knife at the completion of the polishing.

Figure 19:
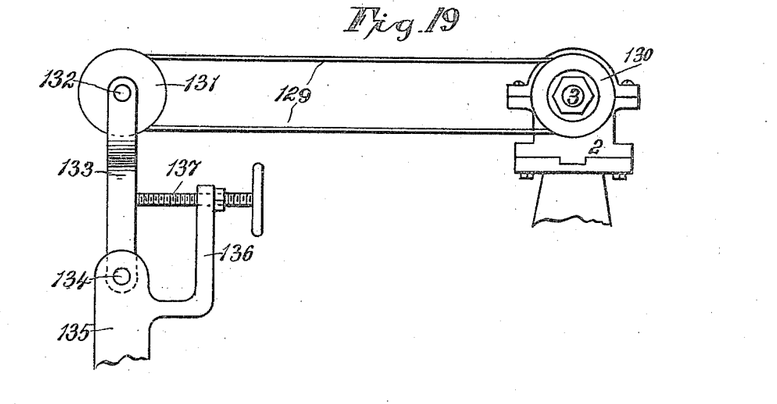
Fig. 19 is an end view of the polishing wheel arbor, broken view of its supporting standard, side elevation of a fixture for supporting a polishing belt when used in place of a polishing wheel, also broken view of the standard for the fixture.
Figure 20:
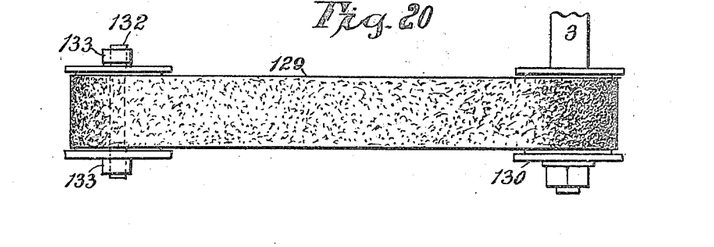
Fig. 20 is a plan view of the polishing belt, pulleys for the same, fixture for supporting one end of the belt, and broken view of the arbor.

In Figs. 19 and 20 is shown the polishing belt 129 used in many cases in preference to the polishing wheel. The flange collar 130 is mounted on the end of the arbor 3 in place of the polishing wheel and a similar flange pulley 131 is mounted on the short shaft 132 for the belt to run on. The shaft 132 is journaled in the upper end of the forked lever 133 whose lower end is journaled on the pin 134 of the standard 135. The arm 136 of the standard supports the adjusting screw 137 by means of which the polishing belt is kept sufficiently taut.

It will be understood that where the term "polishing wheel" is used throughout the specification and claims, it also embraces the polishing belt as well.

Having thus described my invention, what I claim is:

1. In a machine of the character described, a base, a polishing wheel, a support for said wheel mounted on the base, a sleeve having a radial oscillation, a support for the sleeve, a presser arm support operatively connected to the sleeve, a presser arm pivoted to said support and overlying the polishing wheel, a bed located above the base and at one side of the polishing wheel, mechanism for automatically oscillating the sleeve, mechanism for automatically rotating a knife handle, mechanism for automatically oscillating the presser arm support at right angles to the oscillation of the sleeve mounted on the bed and adapted to be inclosed as a protection against abrading material.

2. In a machine of the character described, a bed, a standard mounted thereon, a rod anchored thereto, a sleeve mounted to oscillate on the rod, a presser arm support secured to the sleeve and adapted to oscillate therewith and also adapted to have an independent oscillation at right angles to oscillation of the sleeve, means for oscillating the sleeve, and means for effecting the oscillation of the presser arm mechanism independently of the sleeve and at right angles to the oscillation of the sleeve.

3. In a machine of the character described, a polishing wheel, presser arm support, an oscillating sleeve, a support therefor, the presser arm support operatively connected to the sleeve, means for effecting an oscillatory movement of said presser arm support at right angles to the oscillatory movement of the sleeve, a pivoted presser arm mounted on said presser arm support, and a presser foot carried by the arm and overlying the polishing wheel.

4. In a machine of the character described, a polishing wheel, an oscillating sleeve, a support for the sleeve, a presser arm support operatively connected to the sleeve and adapted to oscillate therewith, means for oscillating the presser arm support at right angles to the oscillation of the sleeve, a presser arm pivoted to the sleeve, a presser arm support, a presser foot pivotally supported to said arm, a trip rod and a weight carried by the presser arm support, the former to release the sleeve and the latter to oscillate said sleeve and carry the presser foot away from the polishing wheel.

5. In a machine of the character described, a polishing wheel, an oscillatory sleeve, a support therefor, presser arm support secured to and oscillating with the sleeve, a presser arm pivoted to said support, a presser foot carried at one end of said presser arm and a weight at the opposite end of its support, a trip rod for releasing the sleeve, a buffer spring and means carried by the sleeve to engage therewith to serve as a shock-absorber when the sleeve is suddenly released and actuated by the weight, and means carried by the sleeve for adjusting the relative position of the spring with respect to the oscillation of the sleeve for different diameters of polishing wheels.

6. In a machine of the character described, a polishing wheel, a driving shaft, a radially operated frame journaled on the shaft, a knife rotating shaft journaled in the frame, means for connecting a knife with the shaft and means for radially adjusting the frame for different diameters of polishing wheels and a spring to prevent undue lifting of the frame.

7. In a machine of the character described, a polishing wheel, a driving shaft, a radially operated frame journaled on said shaft, a knife rotating shaft journaled in the free end of the frame, means for radially adjusting the frame, an elliptical gear carried by the knife operating shaft, an elliptical gear carried by the frame to register therewith, and means for rotating the elliptical gear carried by the frame, from the driving shaft.

8. In a machine of the character described, a polishing wheel, a driving shaft, a radially operated frame journaled thereon, a spur gear and an elliptical gear rotatably mounted on the frame and rotatably connected together, means for driving the spur gear from the driving shaft, a knife rotating shaft journaled in the frame, an elliptical gear mounted on said shaft registering with the elliptical gear of the frame, an oscillatory sleeve, a bar pivotally connected therewith, presser arm support attached to the sleeve, a presser foot carried by the support, a trip lever pivoted to the bar, means for temporarily locking the trip lever to said sleeve, a cam on the knife rotating shaft adapted to actuate the bar and rotate the sleeve to bring an extra pressure on the knife handle when the flat or elongated side of the handle is presented to the wheel, and means for limiting the movement of said bar.

9. In a machine of the character described, a polishing wheel, an oscillatory sleeve, presser arm support carried by the sleeve, a presser arm pivoted to the support, a spring engaging the arm, a presser foot carried by the arm, and mechanism for oscillating the sleeve to increase the pressure of the presser foot against the handle of a knife when the flat side of said handle is resting on the polishing wheel.

10. In a machine of the character described, an oscillating sleeve, presser arm support connected thereto, a driving shaft, a continuously running pulley mounted thereon, a cam shaft, means for imparting a step by step rotation of the cam shaft from the driving shaft, clutch mechanism located between the sleeve and driving shaft, and means actuated by the sleeve to engage the clutch mechanism with the pulley to rotate the driving shaft, and a cam on the cam shaft to disengage the clutch mechanism and bring the machine to a state of rest.

11. In a machine of the character described, an oscillatory sleeve, a support therefor, presser arm support carried by the sleeve and oscillating therewith and also pivotally supported to have a lateral swinging movement independently of the sleeve, a driving shaft, a cam shaft, means for imparting a step by step rotary movement to the cam shaft, a cam on the cam shaft, and means connecting the cam with the presser arm support to impart a lateral motion thereto.

12. In a machine of the character described, a polishing wheel, an oscillatory sleeve, a support therefor, presser arm support secured to the sleeve and oscillating therewith, means for effecting an oscillatory movement of said support at right angles to the oscillation of the sleeve, a presser arm carried by said support and pivoted thereto, and a presser foot carried at the free end of said arm and pivotally supported thereto so that said foot will always remain parallel with the polishing wheel during said right angle movement of the presser arm support.

13. In a machine of the character described, a hollow shaft, a knife holder, a knife holder driving wire, means for anchoring one end of the wire to the shaft, the outer end of the wire projecting from the hollow shaft and secured to the knife holder.

14. In a machine of the character described, an abrading wheel, a presser arm overlying the wheel, a handle lever overlying the presser arm, a presser foot carried by the arm to engage an oval knife handle, and a spring between the handle lever and presser arm to increase the pressure of the presser foot against the handle of a knife when the flat side of the handle is against the wheel.

In testimony whereof I affix my signature.

CARL H. HEMMING.

Copies of this patent may be obtained for five cents each, by addressing the "Commissioner of Patents, Washington, D. C."